Inventor
Adino F. Files.
By
Attorney

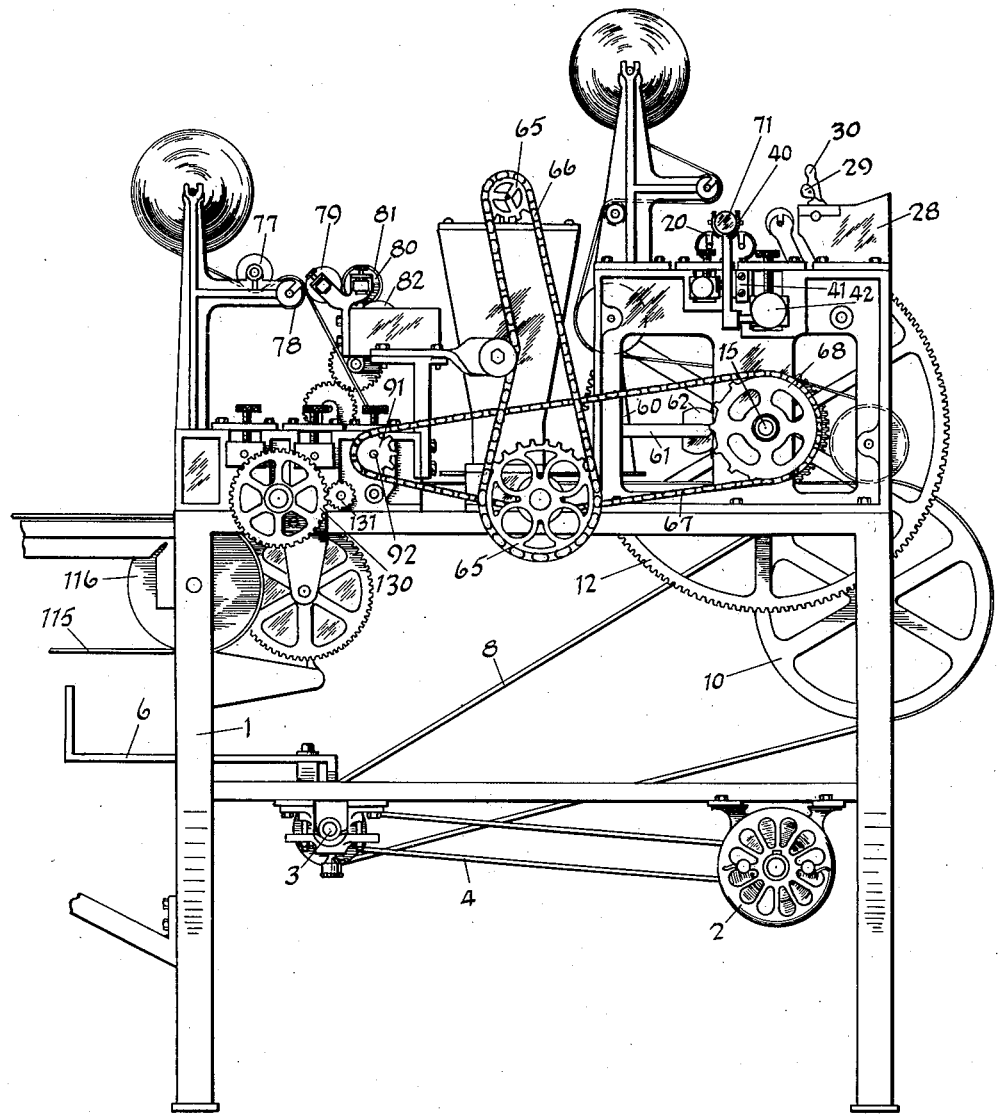

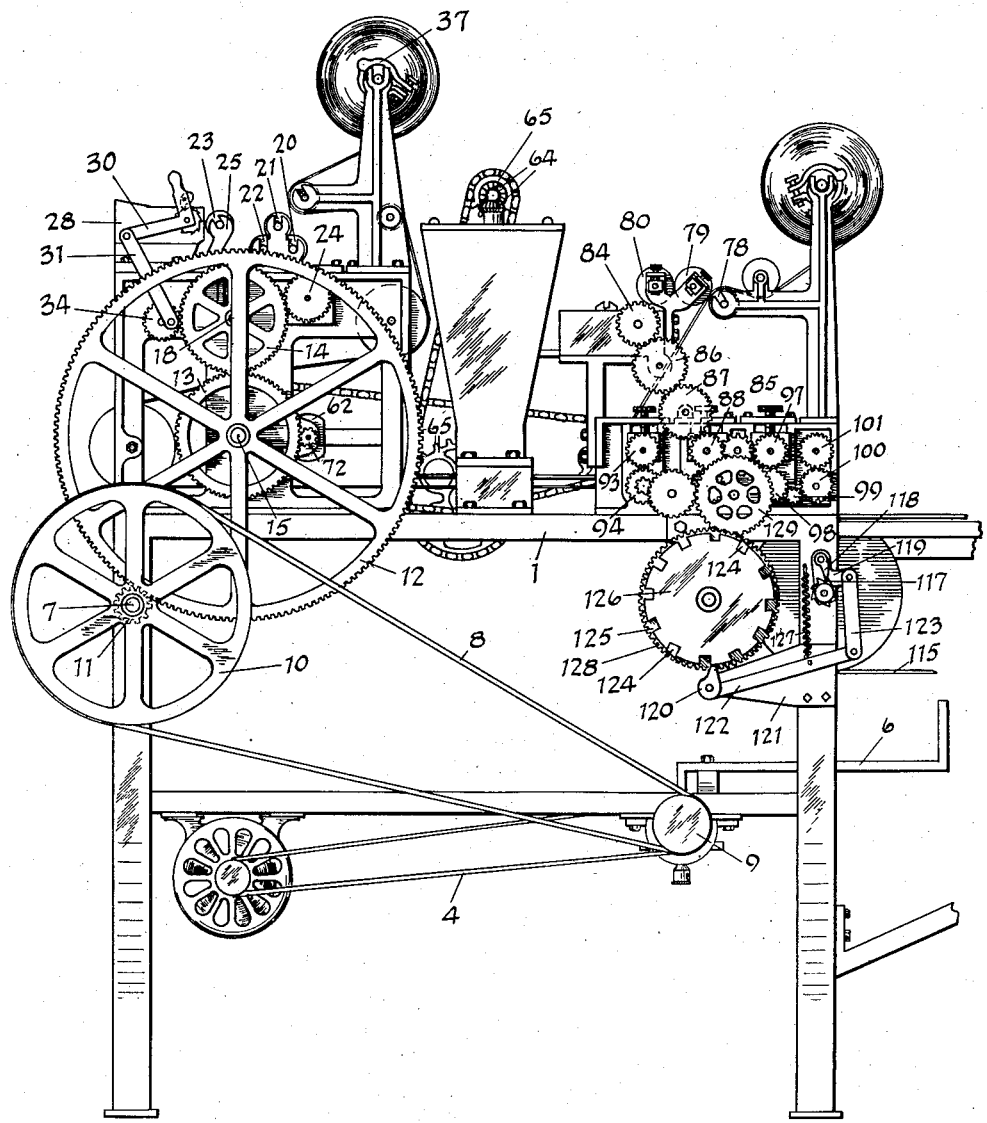

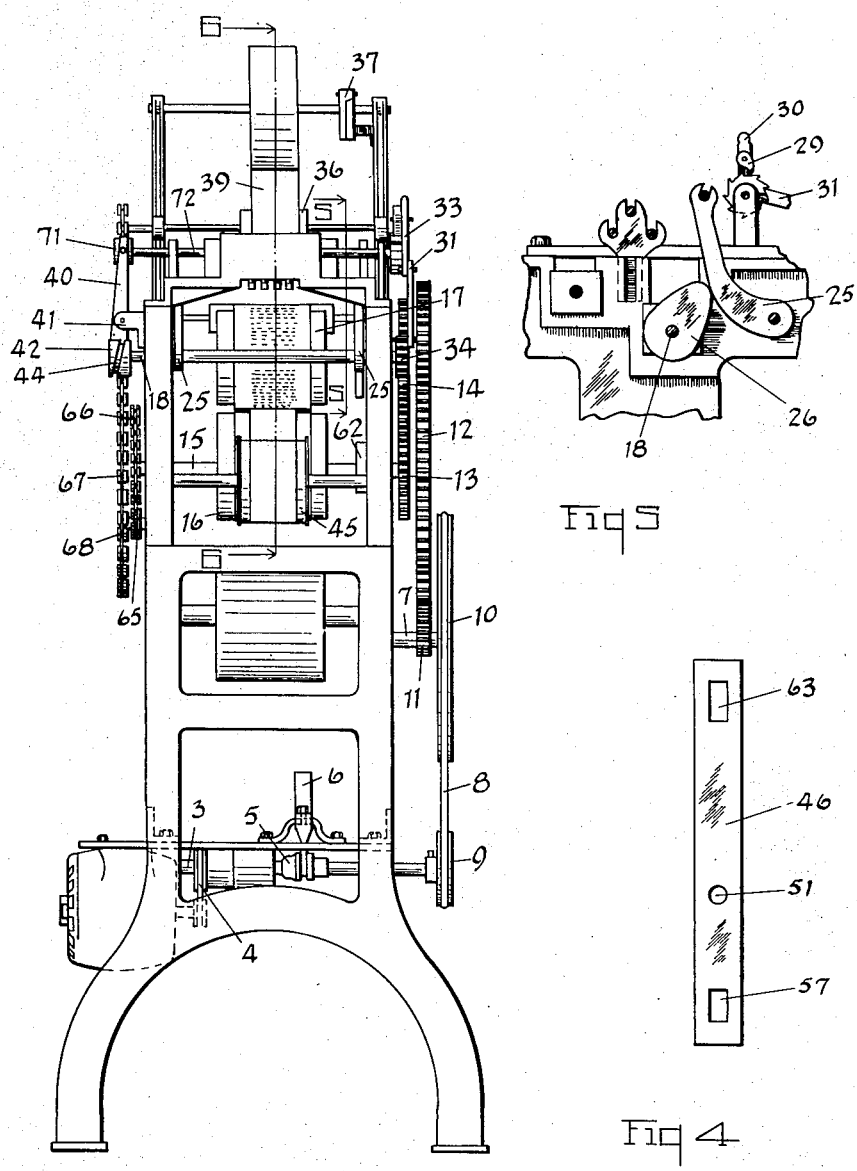

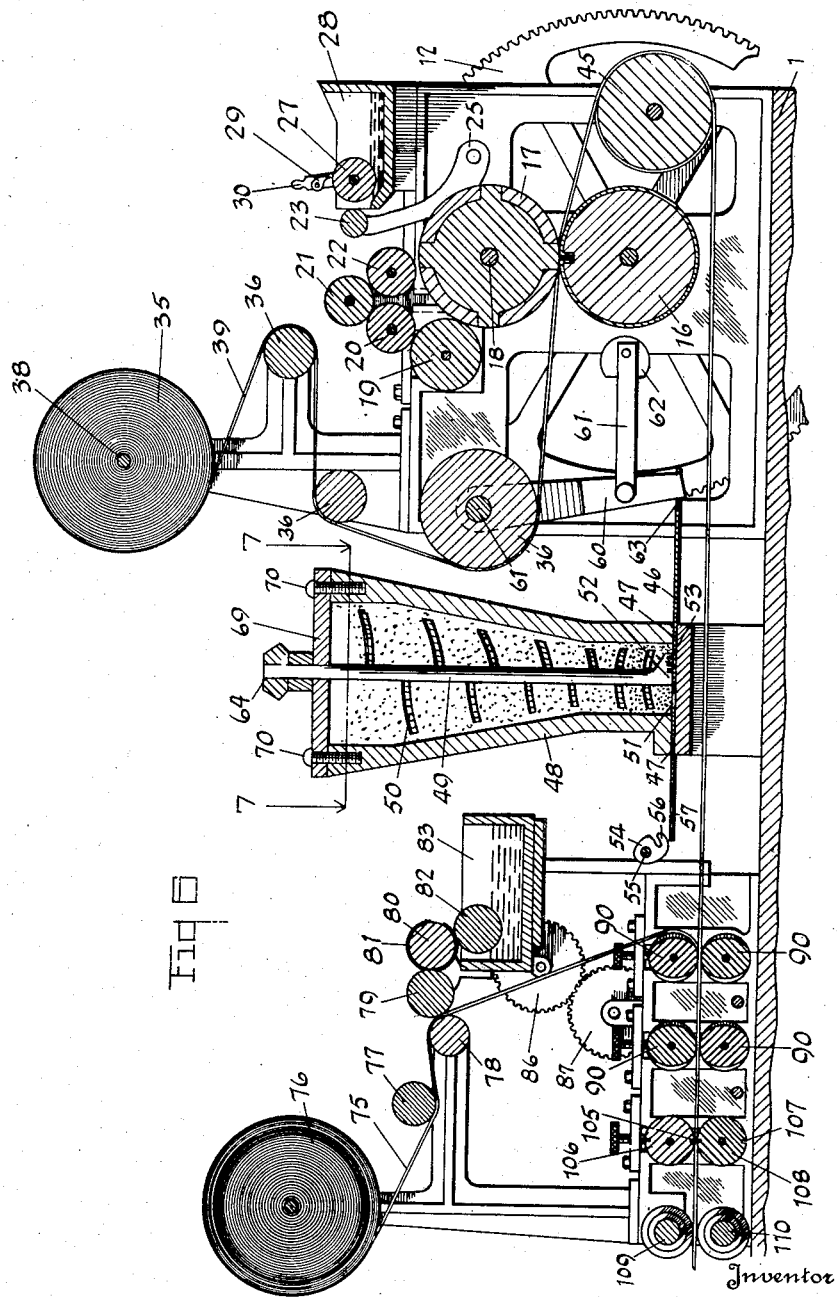

Patented Apr. 19, 1927.

1,625,461

UNITED STATES PATENT OFFICE.

ADINO F. FILES, OF MAUMEE, OHIO.

DISPENSING MACHINE.

Application filed October 19, 1925. Serial No. 63,535.

My invention has for its object to provide an efficient machine for dispensing a predetermined quantity of a substance in each of a plurality of containers that are printed and formed by the machine. The machines embodying my invention feed definite quantities of a powdered material which is enclosed in containers that are formed by the machines and are also preferably printed by the machines.

In the preferred form of construction a sheet material is continuously fed to a printing mechanism, and the substance is placed on the sheet in a definite position relative to the printed portions of the sheet. A second sheet is also continuously fed in the machine and a cementitious material, such as, glue is placed thereon in such a position as to outline each printed portion or as to surround the portions of the substance deposited on the first sheet when the sheets are brought together. The sheets are then cut to form packets and the packets are piled in definite quantities for packing and shipment.

The invention may be contained in machines which in their details of construction differ from each other, and to illustrate a practical application of the invention and set forth a description thereof I have selected a machine containing my invention and shall describe it hereinafter. The structure selected for purposes of illustration is shown in the accompanying drawings.

Figure 7:
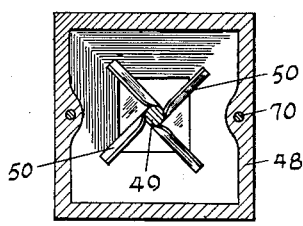
Figure 8:
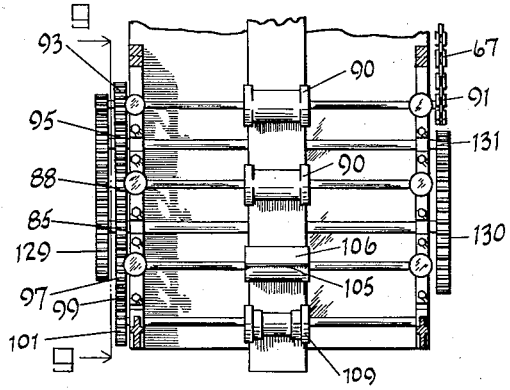
Figure 9:
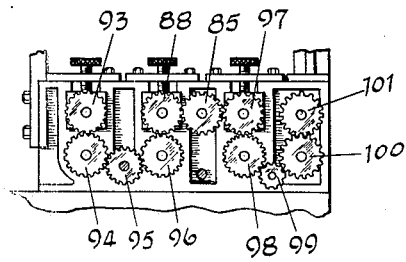
Figure 10:
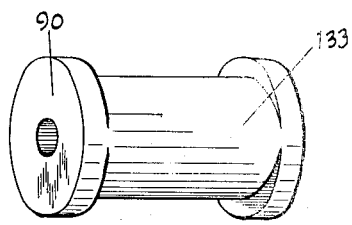
Figure 11:
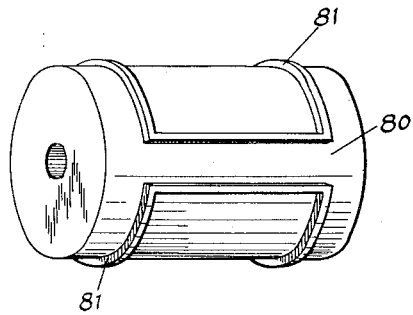

Figure 1 of the drawings is a view of one side of the machine. Fig. 2 is a view of the side opposite to that shown in Fig. 1. Fig. 3 is an end view of the machine. Fig. 4 is a view of a dispensing plate. Fig. 5 is a view of a section taken on the plane of the line 5—5 indicated in Fig. 3. Fig 6 is a view of a section taken on the plane of the line 6—6 indicated in Fig. 3. Fig. 7 is a view of a section taken on the plane of the line 7—7 indicated in Fig. 6. Fig. 8 is a top view of the part of the machine that forms the bag. Fig. 9 is a view of a section taken on the plane of the line 9—9 indicated in Fig. 8. Fig. 10 is a perspective view of one of the bag forming rollers. Fig. 11 is a perspective view of the glue outline roller.

The particular machine embodying my invention and which is shown in the drawings provides a means for forming bags from two sheets of paper that are drawn from rolls as the paper is used in forming the bags. The bags are formed by cementing together edge portions of parts of the paper. Before sealing the edge portions and severing the paper, the substance is located within the central part of each part that is to be severed from one of the sheets in making the bag. The machine is also provided with means for placing glue or similar cement on the other sheet in advance of its being severed. The machine is also provided with a printing mechanism for printing one sheet while the other sheet is receiving the glue or mucilage. The bag parts are operated upon by means that press the paper so that the cementitious material will tightly seal the edge portions of the parts that form the bags. The joined parts of the sheets are then severed to form the completed bags.

The parts of the machine are mounted on the frame 1 and the movable members are driven by means of the motor 2 which is secured to the frame 1. The motor is connected to a shaft 3 by means of a belt 4. A clutch 5 is located on the shaft 3 and so as to be operated by the lever 6 one member of the clutch being keyed to the shaft 3, while the other member is rotatable on the shaft 3. The shaft 3 is connected to the shaft 7 by means of the belt 8 located on the pulleys 9 and 10. A pinion 11 driven by the wheel 10 meshes with the gear wheel 12 and causes rotation of the gear wheels 13 and 14. The gear wheel 13 is connected to the gear wheel 12 while the gear wheel 14 meshes with the gear wheel 13. The gear wheels 12 and 13 are connected to the shaft 15 and a blanket roller 16 is also connected to the shaft 15. A printing roller 17 is connected to the shaft 18 to which the gear wheel 14 is connected. The printing roller 17 is provided with raised type to produce the desired impression or printing on the paper that may be passed between the rollers 16 and 17. Preferably, the roller 17 is provided with four curved plates having the same printing matter on each whereby upon a single rotation of the roll 17 four impressions will be produced on the sheet. The roller 17 is inked by means of the inking rollers 19, 20, 21 and 22 and the ink conveying roller 23. The roller 19 is driven by means of the gear wheel 24 which meshes with the gear wheel 14 while the rollers 21, 20 and 22 are idlers for spreading the ink over their surfaces in order that a uniform film or spread may be placed upon the roller 19. The roller 21 is shifted longitudinally by means of a lever 40 that is pivotally supported on the bracket 41 which is attached to the frame 1. It is connected to a grooved cylindrical block 42 by any suitable means such as the finger 43 that extends into the groove 44. The block 42 is connected to the shaft 18 and as the print roller is rotated the upper end of the lever 40 is moved in transverse directions with respect to the machine. The lever 40 is pivotally connected to the head 71 located on the shaft 72 which supports the roller 21. The roller 23 is supported on a pair of arms 25 that are operated by cams 26 which are connected to the shaft 18 to cause the roller 23 to be moved to and from the fountain roller 27 which delivers the ink from the fountain or container 28 that is supported on the frame of the machine. The fountain roller 27 is rotated by means of a dog or ratchet 29 that is operated by a lever 30 and link 31, the link 31 being eccentrically connected to the gear wheel 34 that meshes with the gear wheel 14. Thus the printing roller 17 receives the desired quantity of the ink from the container 28.

The paper is fed to the printing rolls from a roller 35. Preferably the paper is directed over idlers 36 that increases the distance or the length of paper between the printing rolls and the roll 35 from which the paper is drawn. Preferably, a clamp 37 is used for clamping the supporting pin or bar 38 on which the roll 35 is located to produce resistance to the rotation of the roll 35 and thus keep the paper 39 under tension while it is being drawn through the machine and being printed until it is severed in the formation of the bags.

The paper 39 passes over the roller 45 and consequently the printing is turned to the under side of the sheet. It then passes beneath the dispensing plate 46 from which it receives the substance, namely, the powder that is to be bagged. The dispensing plate 46 operates to subdivide the material into definite and substantially equal quantities and deliver each quantity on to the sheet of paper in positions that correspond to the printed areas that are located on the underside of the sheet. Thus the dispensing plate 46 will deliver each quantity of the powdered material to the sheet at a point preferably located opposite to the area that has been printed by the printing wheel 17.

The dispensing plate 46 is supported for reciprocal movements in slots 47 that are formed in the bottom of a hopper 48 in which the powdered material is located. The plate 46 preferably covers the bottom of the hopper 48 so that as the material is dispensed it will be continuously fed on to the plate. In order to prevent clogging or packing of the material beyond a predetermined amount the hopper is provided with a shaft 49 on which are located a plurality of vanes 50. The vanes 50 are so disposed as to not only agitate the material within the hopper but also to work the material downward without permitting the packing of the material. This is accomplished by using vanes, some of which are bent to a plane that is inclined at an angle to the horizontal so that when the shaft 49 is rotated in one direction the material will be lifted while other of the vanes are located at such an angle that upon the same rotation the material will be carried downward. This keeps the material loose and prevents localized packing that would prevent the downward movement due to its own weight which is about the movement that it is desired to produce in the hopper in order that the material might be uniformly fed to the dispensing plate. The lowermost of the vanes operates to move the material towards the dispensing plate and to pack it to some extent. This extent may be varied according to the inclination of the lowermost of the vanes. The dispensing plate is provided with a small opening 51 into which the substance is forced by, particularly, the lowermost of the vanes 50 and in order to prevent the formation of a hard packed layer, particularly, where the material is formed of an exceedingly amorphous material, a scraper is used to positively remove or scrape the surface of the plate and thus leave a definite quantity in the opening 51 formed in the plate. The lower end of the shaft 49 is provided with projecting lugs or feet 52 having corrugated surfaces 53 on their under sides. The lower sides of the feet 52 are pressed against the surface of the plate 46 and the corrugations scrape and disturb the substance that might be packed upon the plate in the operation of the machine, and at the same time scrape all the edges of the opening 51 in order that the same quantity of material may be inserted in the opening upon the return of the portion of plate having the opening into the bottom of the hopper.

The plate 46 is reciprocally moved to place the opening 51 within the hopper to receive the substance in definite quantities and then without the hopper in order that the material may be delivered from the opening 51. The substance is thus conveyed through one of the slots 47 formed in the bottom of the hopper and in close proximity to the sheet 39. In its outward movement it is carried to a point so as to locate the opening 51 over, substantially, a central portion of the printed matter formed on the opposite side of the sheet when the dispensing plate 46 is snapped in order to cause the substance that is partially packed within the opening 51 to dislodge from the plate and drop on to the paper in the desired position.

When the dispensing plate 46 is moved outward to a certain point, the outer end engages a cam member 54 that is pivotally supported on the rod 55 and normally is disposed in position by its own weight so that it will engage the end of the plate 46 as the plate is moved outward. It has a finger 56 which rolls on the end portion of the plate and then slips into an opening 57 formed in the plate. When the cam enters the opening 57 the following edge of the opening 57 is struck by the end of the finger 56 which jars the substance that is located in the opening 51 and causes it to drop to the sheet 39. Upon the return movement of the dispensing plate 46 it is again loaded, that is, the substance is semi-packed within the opening 51 and upon continued reciprocation of the plate 46 the material is delivered in predetermined quantities to the sheet 39 and in proper relation to the printed matter or in the proper relation with respect to the parts of the sheet from which the bags are formed and so that each portion of the material thus dispensed will be located in a bag that is formed by the machine.

The dispensing plate is oscillated by means of an arm 60 that is pivotally supported on the ends of the shaft 61 on which one of the tension rollers 36 is located. The arm 60 is moved by means of the link 61 which is eccentrically connected to the disk 62. The disc 62 is rotated by means of the pinion 72 which meshes with the pinion 13. Rotation of the disc 62 causes the arm 60 to oscillate back and forth. The lower end of the arm 60 extends into an opening 63 formed in the end of the dispensing plate 46. Oscillatory movements of the arm 60 will cause reciprocatory movements of the dispensing plate 46 as the material is measured by the dispensing plate and the shaft 49 and the parts connected thereto. The shaft 49 may be rotated by means of bevel gear wheels 64, the sprocket wheels 65 and the sprocket chain 66 which receive power from a sprocket chain 67. The sprocket chain is moved by the sprocket wheel 68 which is connected to the shaft 15 that is driven by means of the gear wheel 12. The hopper 48 may be provided with a bar 69 that may be secured in position by means of the screw 70. The bar 69 forms a bearing support for the spindle 49.

While the sheet 38 is being printed and the substance is being dispensed thereto a second sheet 75 that is drawn from the roller 76 and is being glue outlined with a cementitious material in such a manner that the outline will be located in such portions that form the edges of the bags when completed. The sheet 75 passes under the idle roller 77 and over the idle roller 78. A third roller 79 is pressed against the sheet 75 as it is drawn over the roller 78 to deliver to it a mucilage or glue or other cementitious material along definite lines. A roller 80 has raised portions 81 that conform to the outline along which it is desired to deposit the cementitious material on the sheet 75. The raised portions 81 of the roller 80 make contact with the glue feed roller 82 that is located in the fountain or container 83. The roller 82 is rotated by means of the gear wheel 84 which is connected to the gear wheel 86 which receives its power through the train of gears shown in Fig. 2 as hereinafter described, through the idlers 86, 87, and 88. This causes rotation of the roller 80 and causes the transfer of the glue from the roller 82 to the paper and in the definite outlines determined by the shape of the raised portions 81 of the roller 80. The glue is placed upon the sheet 75 in position so that when the sheets are brought together the glue will be located between the sheets and at the outer edges of the parts that form the bags.

The sheet 75 is directed to the sheet 39 and so as to be placed thereon after the substance has been deposited in its proper position with respect to the printed area of the sheet 39. The marginal line of glue is deposited about each quantity of substance that is dispensed from the hopper 48 and the divided substance located between the sheets is drawn by the rollers 90. There are two pairs of rollers 90 that continuously engage the edge portions of the sheets and to firmly press the said edge portions continuously as the sheets are drown through the machine. The ends of the rollers 90 are cylindrical in form but their central portions are made substantially elliptical and the rollers of each pair are so geared to each other that the larger diameters of the central portions of the rollers will intermittently be located in alinement and so that the sheets will be pressed along lines that extend transversely with respect to the sheets during the intermittent periods. The rollers being elliptical in cross section the substance will pass between the rollers when the smaller diameters are in alinement and thus material disturbance of the substance will be avoided, that is, undue pressure of the substance will be obviated. The sheets are so disposed with respect to the rollers that the intermittent periods will occur when the sheets are so located with respect to the rollers 90 that the transverse glue lines which are formed by the raised portions 81 of the roller 80 on the sheet 75 will be pressed and thus the sheets will be sealed not only along the marginal line but also along the transverse lines.

The rollers 90 are driven by the sprocket chain 67 which operated on the sprocket wheel 91 located on the shaft 92 which is connected to one of the rollers 90 and to the gear wheel 93 that is connected through the chain of gears 94, 95, 96, 88, 85, 97, 98, 99, 100 and 101. The other rollers 90 are located on the shafts of the gear wheels 94, 88 and 96. When the sheets have thus been sealed to form individual closed portions containing the divided substance that is dispensed upon the sheet 39, they are cut along the glued transversely extending lines. Preferably, the sheets are severed by the adjoining parallel lines that extend across the sheets and which are so disposed by the parallel portions of the ridges 81 located on the roller 80. The sheets are severed by means of the knife blades 105 located in the roller 106 which enter the slots 107 formed in the roller 108. The rollers 106 and 107 are connected to the gear wheels 97 and 98. The sheets are thus severed and at the same time the containers for the subdivided substance are formed. A pair of draw rollers 109 and 110 have end portions which have a diameter larger than the central portions of the rollers and dimensions such that they will press the edges of the bags and draw them quickly from the rollers 106 and 108 as they are severed by the knives 105. The rollers 109 and 110 operate to deliver the finished printed and sealed containers from the machine.

The containers may be delivered to a belt 115 that passes over the pulley 116. If desired the belt 115 may be given step by step movements that are controlled by the operations of the machine so as to form bundles or piles of the containers having a definite number in each pile. In the machine shown in the drawings the belt 115 is moved by means of the rachet 117 which is operated by the dog 118 located on the pivoted arm 119. The dog 118 engages and moves the ratchet 117 by means of the cam 120 which is pivotally supported on the bracket 121. An arm 122 is connected to the cam 120 and a link 123 connects the end of the arm 122 with the pivoted arm 119. The cam 120 is operated by blocks 124 that may be secured in any number of the slots 125 that are formed in the disc 126. The blocks 124 have parts that extend beyond the outer surface of the disc 126 so as to engage the nose of the cam 120 and cause the arm 122 to swing downward against the tension of the spring 127. This moves the arm 119 and causes the dog 118 to step the pulley wheel 116 around so as to move the belt 115 a step forward. Inasmuch as the disc 126 is geared to the machine through the gear wheels 128 and 129 shown in Fig. 2 and the gear wheels 130 and 131 shown in Fig. 1 and the gear wheels 95, 94, and 93 which receive their power from the sprocket wheel 91. The blocks 124 are spaced apart in the disc 126 so as to cause the desired number of containers to be piled one upon each other as they are delivered from the machine by the rollers 109 and 110. The piles may be removed by hand or otherwise by the belt 115 and packed for shipment as may be desired.

I claim:

1. In a dispensing machine for dispensing separated quantities of a substance in containers, means for feeding two sheets of a material, means for forming outlines of cementitious material on one of said sheets, means for depositing the substance on the other of the said sheets and means for securing the sheets together along the cementitious outlines.

2. In a dispensing machine for dispensing separated quantities of a substance in containers, means for feeding two sheets of a material, means for forming outlines of cementitious material on one of said sheets, means for dispensing the substance to be dispensed on one of the sheets and means for securing the sheets together along the cementitious outlines, and means for serving the two sheets of material between the cementitious outlines.

3. In a dispensing machine for dispensing separated quantities of a substance in containers, means for feeding two sheets of a material, means for forming outlines of cementitious material on one of said sheets, means for depositing the substance on the other of the said sheets and means for securing the sheets together along the cementitious outlines, and means for serving the two sheets of material between the cementitious outlines.

4. In a dispensing machine for dispensing separated quantities of a substance in containers, means for feeding two sheets of a material, means for forming complete outlines of cementitious material on one of said sheets, the completed outlines being entirely separated from each other, means for depositing the substance on the other of the said sheets and means for securing the sheets together along the cementitious outlines and means for serving the two sheets of material between the cementitious outlines.

5. In a dispensing machine for dispensing separated quantities of a substance in containers, means for feeding two sheets of a material, means for forming outlines of cementitious material on one of said sheets, means for printing on the other of the sheets and means for depositing the substance to be dispensed on the last named sheet and on the opposite side of the sheet from that which is printed and means for securing the sheets together.

6. In a dispensing machine for dispensing separated quantities of a substance in containers, means for feeding two sheets of material through the machine, means for forming outlines of cementitious material on one of the sheets and means for printing defined areas of the other of the sheets and means for placing the outlines of cementitious material formed on one sheet in definite relation with respect to the printed areas on the other sheet, and means for placing quantities of the said substance within the said areas and means for sealing the sheets together along the said outlines to form containers.

7. In a dispensing machine for dispensing separated quantities of a substance in container, means for feeding two sheets of material through the machine, means for forming outlines of cementitious material on one of the sheets and means for printing defined areas of the other of the sheets and means for placing the outlines of cementitious material formed on one sheet in definite relation with respect to the printed areas on the other sheet, and means for placing quantities of the said substance within the said areas, means for sealing the sheets together along the said outlines to form containers, means for severing the said sheets between the said areas and the said outlines.

In testimony whereof I have hereunto signed my name to this specification.

ADINO F. FILES.